United States Patent [19]

Nigrin

[11] 4,285,731
[45] Aug. 25, 1981

[54] LEAD-FREE AND CADMIUM-FREE FRITS
[75] Inventor: Jaroslava M. Nigrin, Corning, N.Y.
[73] Assignee: Corning Glass Works, Corning, N.Y.
[21] Appl. No.: 121,744
[22] Filed: Feb. 15, 1980
[51] Int. Cl.$^3$ .......................... C03C 3/08; C03C 5/00
[52] U.S. Cl. ........................................ 106/48; 106/54
[58] Field of Search ..................................... 106/48, 54
[56] References Cited

U.S. PATENT DOCUMENTS

| | | | |
|---|---|---|---|
| 3,716,385 | 2/1973 | Ritze | 106/54 |
| 3,902,910 | 9/1975 | Hares et al. | 106/54 |
| 4,061,584 | 12/1977 | Girard et al. | 106/54 |
| 4,084,976 | 4/1978 | Hinton | 106/48 |
| 4,120,733 | 10/1978 | Knapp | 106/54 |
| 4,179,300 | 12/1979 | Sagara | 106/54 |

Primary Examiner—Earl C. Thomas
Assistant Examiner—Mark Bell
Attorney, Agent, or Firm—Clinton S. Janes, Jr.

[57] ABSTRACT

This invention is related to the production of glazes and enamels for decorating glass, glass-ceramic, and ceramic articles. The glass frits suitable therefor exhibit good glass stability, coefficients of thermal expansion (20°–300° C.) between about $65$–$75 \times 10^{-7}/°C.$, demonstrate excellent resistance to attack by acids and bases, and, being essentially free from toxic heavy metals such as lead, are eminently useful in food preparation and service applications. The frit compositions are encompassed within the system $Li_2O$—$BaO$—$TiO_2$—$ZrO_2$—$B_2O_3$—$SiO_2$, wherein at least one member of the group consisting of MgO, CaO, ZnO, and $Bi_2O_3$, is optionally present. Operable frits are encompassed within the ranges, expressed in weight percent, of:

| | |
|---|---|
| $SiO_2$ | 35–47% |
| $B_2O_3$ | 5.5–9 |
| BaO | 24–42 |
| $TiO_2$ | 1.5–4 |
| $ZrO_2$ | 6–10 |
| $Li_2O_3$ | 1–5 |
| MgO | 0–5 |
| CaO | 0–4 |
| SrO | 0–8 |
| ZnO | 0–10 |
| $Bi_2O_3$ | 0–8 |
| SrO + MgO + CaO + ZnO + $Bi_2O_3$ | 0–10 |

2 Claims, No Drawings

LEAD-FREE AND CADMIUM-FREE FRITS

BACKGROUND OF THE INVENTION

The use of glass, glass-ceramic, and ceramic bodies in food service applications, i.e., as culinary ware and tableware, is widely recognized. Such bodies, especially those prepared from glasses and glass-ceramics, have occasionally been marketed in the plain state, i.e., without external decoration. Nevertheless, the great majority of the commercially-available food service products relies upon the aesthetic appearance of the products to promote customer appeal. Consequently, research and development have been quite extensive to provide decorative designs and finishes for the surfaces of such bodies. The bulk of this effort has been directed to developing attractive glazes and enamels. Reduced to the most fundamental terms, glazes can be considered clear glasses and enamels as glazes containing pigments to impart color thereto. Both products are applied to the surface of the glass, glass-ceramic, or ceramic body to be decorated in the form of very finely-divided particles, customarily referred to as "frit", and this frit then fired to fuse to and form a strongly-adherent, continuous film on the surface of the body.

Up to the present time most of the commercially-marketed frits for decorating glass, glass-ceramic, and ceramic ware have included substantial amounts of lead oxide (PbO) and, in several instances, cadmium oxide (CdO). Those compounds have been incorporated into the frit compositions for two principal reasons: (1) to soften the frit, i.e., to lower the melting point thereof so it could be fused onto the surface of the ware at a sufficiently low temperature that thermal deformation of the ware could be avoided; and (2) to raise the refractive index thereof. CdO has also been utilized as a colorant in certain frits. Cadmium and lead, however, possess the inherent disadvantageous characteristic of being highly toxic, such that glazes and enamels containing those metals which come into contact with food must display extremely good resistance to attack by acidic and alkaline materials, thereby preventing the release of any significant amount of those metals. The danger arising from the release of those metals, when compositions containing such come into contact with food, has been recognized by the Food and Drug Administration (FDA). That agency, in its Compliance Guidance Manual, issued June 13, 1974, established maxima for cadmium and lead release which a food-contacting surface must not exceed.

It is quite apparent that the potential for cadmium and/or lead toxicity could be completely removed by preparing frits wherein those metals were totally absent. The inability to satisfy the following combination of four criteria demanded in an acceptable glaze or enamel has forestalled the simple elimination of those metals, particularly lead, from the frits.

First, the firing or maturing temperature of the frit, viz., the temperature at which the frit will flow sufficiently to produce a smooth homogeneous coating, must be low enough to preclude thermal deformation of the ware being coated.

Second, the coefficient of thermal expansion must be compatible with that of the ware to inhibit crazing and/or spalling of the resultant glaze or enamel. Most advantageously, the frit will demonstrate a coefficient of thermal expansion somewhat less than that of the ware being coated. Such practice places the decorating coating in a state of compression with respect to the ware after being fired thereon.

Third, the frit must exhibit excellent resistance to attack by acids and bases and, in food service applications, to attack by detergents used in commercial dishwashers. Corrosion of the surface can result in loss of gloss, the development of haze or iridescence in the glaze or enamel, the formation of porosity, or other effects deleterious to the aesthetic appearance or physical character of the decorative coating.

Fourth, the frit must demonstrate good glass stability, i.e., the frit must resist devitrification during the firing operation.

Although not mandatory, a fifth desirable property for the frit is a refractive index high enough to yield a coating displaying a clear high gloss.

Whereas compositions have been explored which have satisfied several of those criteria, research has been constant to develop frits free from lead and cadmium which would answer the full combination of those requirements.

It will, of course, be appreciated that frits can be utilized for purposes other than as bases for decorative glazes and enamels. In such applications a high gloss, resulting from the high refractive index of the composition, may not be necessary. Also, in certain decorative practices, a highly glossy surface coating is not deemed desirable. Nevertheless, under either of the circumstances, the frits will still advantageously display the first four of the above-cited criteria. Thus, the firing temperature of the frit will be low enough to avoid thermal deformation of the substrate being coated. The coefficient of thermal expansion of the frit must be compatible with that of the substrate. The frit must demonstrate excellent chemical durability. And, to insure the development of a transparent coating, the frit will exhibit good glass stability.

OBJECTIVES OF THE INVENTION

The principal objective of the instant invention is to produce frit compositions useful as base materials for glazes and enamels which, because the toxic heavy metals cadmium and lead are essentially absent therefrom, are eminently suitable for decorating food service ware.

Another objective of the instant invention is to produce such frits which demonstrate good glass stability, high indices of refraction, firing temperatures ranging between about 700°–950° C., coefficients of thermal expansion (20°–300° C.) varying about $65$–$75 \times 10^{-7}/°C.$, and excellent resistance to attack by acids and alkalies, especially attack by detergents since the primary application seen for the inventive frits is in the field of food service ware decoration, and, where transparent coatings displaying high gloss are desired, the frits will exhibit high refractive indices.

SUMMARY OF THE INVENTION

I have found that frits satisfying those objectives can be produced from compositions within the $Li_2O$—$BaO$—$TiO_2$—$ZrO_2$—$B_2O_3$—$SiO_2$ system, wherein at least one member of the following group consisting of MgO, CaO, SrO, ZnO, and $Bi_2O_3$, is optionally present. Compositions falling within the operable ambit of the inventive frits consist essentially, expressed in weight percent on the oxide basis as calculated from the batch, of:

| | |
|---|---|
| $SiO_2$ | 35–47 |
| $B_2O_3$ | 5.5–9 |
| BaO | 24–42 |
| $TiO_2$ | 1.5–4 |
| $ZrO_2$ | 6–10 |
| $Li_2O$ | 1–5 |
| MgO | 0–5 |
| CaO | 0–4 |
| SrO | 0–8 |
| ZnO | 0–10 |
| $Bi_2O_3$ | 0–8 |
| SrO + MgO + CaO + ZnO + $Vi_2O_3$ | 0–10 |

As is readily apparent, the potentially toxic heavy metals cadmium and lead form no part of the inventive compositions, thereby recommending their utility in ware having contact with food. The above-recited components can be combined to provide frits displaying good glass stability, and, where desired, high indices of refraction to yield glazes and enamels exhibiting high gloss, firing (fusing) temperatures between about 700°–950° C., coefficients of thermal expansion (20°–300° C.) ranging about $65-75 \times 10^{-7}/°C$., and excellent resistance to attack by acids and alkalies, in particular attack by detergents such as are employed in commercial dishwashers.

$ZrO_2$ and $TiO_2$ serve two functions. First, the combination imparts the exceptional chemical durability to the frits. Second, those ingredients (along with the BaO) are useful in achieving a high index of refraction. However, the inclusion of such substantial amounts of those components, especially a large quantity of $ZrO_2$, raises the softening temperature and the viscosity of the frits to a considerable extent, thereby requiring extensive adjustments to be made to the other constituents to secure the desired combination of the other parameters, particularly glass stability and low firing temperature.

BaO has a profound effect upon the glass stability and refractive index of the inventive frits. Consequently, where glazes and enamels displaying very high gloss are desired, large amounts of BaO will be employed. When such is not demanded, the amount of BaO can be reduced.

Preferably, the inventive frits will be limited in composition to the components recited above. Nevertheless, the presence of minor amounts of compatible metal oxides and fluoride may be tolerated to modify the melting behavior of the frits and/or the physical properties thereof. However, the total of all such extraneous additions will not exceed about 5%. Examples of such additions include very minor amounts of $Na_2O$ and/or $K_2O$ and/or F to soften the frit. The fluoride content will normally not exceed about 3%. It will be recognized, of course, that pigments can be dissolved and/or suspended in the frits to yield an enamel for providing a colored decoration. The colorants and pigments which have been most widely used commercially have been the transition metal oxides, e.g., CoO, NiO, MnO, $Fe_2O_3$, $Cr_2O_3$, and $V_2O_5$. More recently, various rare earths, particularly praeseodymium, erbium, and neodymium, have been utilized for this purpose. Normally, the amount of such pigment will comprise less than 20% by weight and, frequently, less than 5%.

The most preferred compositions will demonstrate coefficients of thermal expansion (20°–300° C.) less than about $70 \times 10^{-7}/°C$. and can be fired to mature glazes at temperatures over the interval of about 700°–850° C. The low coefficients of thermal expansion enable the inventive frits to be compatible with a large proportion of commercially-marketed glass, glass-ceramic, and ceramic bodies utilized in food service applications. As an added advantage, such low coefficients of thermal expansion result in the decorative coating being in compression with respect to the substrate, consequently endowing the coated ware with improved mechanical strength. The low maturing temperatures permit the frits to be fired onto commercially-marketed food service ware without the thermal deformation thereof. These most preferred frit compositions consist essentially, expressed in weight percent on the oxide basis as calculated from the batch, of:

| | |
|---|---|
| $SiO_2$ | 40–45 |
| $B_2O_3$ | 6–8 |
| BaO | 31–39 |
| $TiO_2$ | 2–3 |
| $ZrO_2$ | 8–9.5 |
| $Li_2O$ | 1–2.5 |
| MgO | 0–4 |
| CaO | 0–4 |
| SrO | 0–8 |
| ZnO | 0–6 |
| $Bi_2O_3$ | 0–7 |
| MgO + CaO + SrO + ZnO + $Bi_2O_3$ | 2–8 |

RELATED APPLICATION

United States application Ser. No. 121,745, filed concurrently herewith by the present applicant under the same title, is also directed to frit compositions essentially free from lead and cadmium. Those frits consist essentially, in weight percent on the oxide basis, of

| | |
|---|---|
| $SiO_2$ | 50–60 |
| $B_2O_3$ | 4.5–8 |
| BaO | 0–13 |
| SrO | 0–18 |
| BaO + SrO | 6–30 |
| $ZrO_2$ | 4–8 |
| $Al_2O_3$ | 5–8 |
| $Li_2O$ | 0–4 |
| $Na_2O$ | 0–5 |
| $K_2O$ | 0–5 |
| $Li_2O$ + $Na_2O$ + $K_2O$ | 1–5 |
| MgO | 0–6 |
| CaO | 0–12 |
| $Bi_2O_3$ | 0–10 |
| MgO + CaO + $Bi_2O_3$ | 0–20 |

Those frits manifest good glass stability, a coefficient of thermal expansion (20°–300° C.) between about $52-65 \times 10^{-7}/°C$., a firing (fusing) temperature between about 850°–1100° C., and excellent resistance to attack by acids and bases.

PRIOR ART

U.S. Pat. No. 4,084,976 is directed to lead-free glazes to be utilized in conjunction with alumina bodies. Such glazes consisted essentially, in weight percent, of

| | |
|---|---|
| $SiO_2$ | 50–54 |
| $Al_2O_3$ | 5–8 |
| $B_2O_3$ | 6–12 |
| CaO | 4–6 |
| MgO | 2–8 |
| BaO | 2–5 |
| SrO | 5–8 |
| ZnO | 1–2 |

-continued

| Li$_2$O + Na$_2$O + K$_2$O | 4–6 |
|---|---|

The working examples reported were fired at 1160° C. Such glazes are outside the scope of the inventive compositions.

U.S. Pat. No. 4,120,733 is also drawn to lead-free glazes useful with alumina bodies and statedly provides glazes which are an improvement upon those described in U.S. Pat. No. 4,084,976, supra, in that they mature at temperatures about 80°–100° F. lower. Such glazes consisted essentially, in weight percent, of

| SiO$_2$ | 48–54 |
|---|---|
| Al$_2$O$_3$ | 7–11 |
| B$_2$O$_3$ | 16.5–20 |
| BaO | 11–14 |
| CaO | 2–3 |
| ZnO | 2–2.5 |
| Na$_2$O | 4.25–5.25 |
| K$_2$O | 0.4–1 |

The working examples reported were fired at 1038°–1200° C. Such compositions are quite remote from the inventive glazes.

U.S. application Ser. No. 80,496, filed Oct. 1, 1979 in the name of Richard F. Reade, discloses frits suitable for decorative glazes and enamels which are particularly desirable for food service ware because the potentially toxic metals cadmium and lead are absent therefrom. Such frits have compositions within the R$_2$O—Al$_2$O$_3$—B$_2$O$_3$—ZrO$_2$—SiO$_2$—F system, wherein R$_2$O consists of Na$_2$O with, optionally, Li$_2$O. As such, those frits are outside the purview of the inventive compositions.

DESCRIPTION OF THE PREFERRED EMBODIMENTS

Table I reports a group of frit compositions, expressed in parts by weight on the oxide basis as calculated from the batch, illustrating the instant invention. Inasmuch as the sum of the individual constituents equals or closely approximates 100, for all practical purposes the various components may be considered to be present in weight percent. The actual batch ingredients employed may be any materials, either the oxide or other compound, which, when melted together with the combination of the several constituents, will be converted into the desired oxide in the proper proportions.

Batches for the recorded exemplary compositions were compounded in the indicated proportions and ballmilled to assist in securing a homogeneous melt. Each batch was deposited into a platinum crucible and then introduced into a furnace operating at about 1200°–1300° C. After melting for about two-four hours, one portion of the molten batch was formed into a glass patty having dimensions of about 6"×2"×0.375" and that patty immediately transferred to an annealer operating at about 500°–600° C. The remainder of the melt was poured into a bath of water (drigaged) to yield finely-divided glass particles which, after drying, were dry ballmilled to pass a No. 325 United States Standard Sieve (44 microns).

Table I also lists the softening point (Soft.), annealing point (Ann.), each reported in °C., and coefficient of thermal expansion (Exp.) over the interval 20°–300° C., reported in terms of ×10$^{-7}$/°C., as determined from the above-described annealed patties. Each of the above determinations was undertaken utilizing measuring methods conventional in the glass art.

TABLE I

| | 1 | 2 | 3 | 4 | 5 | 6 |
|---|---|---|---|---|---|---|
| SiO$_2$ | 40.92 | 41.88 | 44.38 | 41.68 | 42.33 | 42.52 |
| BaO | 33.74 | 34.48 | 31.93 | 38.65 | 30.53 | 35.05 |
| B$_2$O$_3$ | 6.49 | 6.60 | 7.00 | 6.61 | 6.71 | 6.74 |
| ZrO$_2$ | 8.25 | 8.50 | 9.00 | 8.40 | 8.53 | 8.57 |
| TiO$_2$ | 2.45 | 2.50 | 2.65 | 2.49 | 2.53 | 2.54 |
| Li$_2$O | 1.73 | 1.34 | 1.42 | 2.17 | 1.35 | 1.36 |
| Bi$_2$O$_3$ | 6.43 | — | — | — | — | — |
| MgO | — | — | 3.62 | — | — | — |
| ZnO | — | 4.70 | — | — | — | — |
| SrO | — | — | — | — | 8.00 | — |
| CaO | — | — | — | — | — | 3.20 |
| Soft. | 744 | 761 | 766 | 746 | 769 | 767 |
| Ann. | 598 | 613 | 608 | 599 | 619 | 606 |
| Exp. | 69.2 | 66.1 | 64.6 | 72.3 | 70.7 | 70.8 |

As was discussed above, the drigaged glass particles were ground to a very finely-divided powder. The powder was hand pressed into a cylindrical shape having a height of about 0.5" and a diameter of about 0.5". Each cylinder was placed onto a platinum foil having a thickness of about 0.025" and the foil introduced into an electrically-fired furnace operating at a desired temperature, the specimens maintained at that temperature for about 10 minutes, and then withdrawn from the furnace to cool to room temperature in the ambient environment.

This firing of the cylindrical mass causes the frit to fuse and flow into the shape of a button, the diameter of which is a practical indication of viscous flow. Thus, laboratory experience has revealed that a button diameter of at least about 1.4 cm (~9/16") is necessary to provide good flow of the fused frit and wetting of a particular substrate which is to be coated. The flow buttons were peeled from the foil and thereafter exposed to tests to measure resistance to chemical attack. It will be apparent, of course, that any particular frit-substrate combination would be tested as such and examined for the degree and wetting of the coating, as well as for the presence of pinholes, crazing, and spalling.

To ascertain the resistance of the frits to acids, the fusion buttons were weighed and then immersed into an aqueous solution containing 10% by weight citric acid. Those immersions were undertaken for 24 hours in a stirred solution operating at a temperature of 96° C. A weight loss of no more than about 0.02% was considered to indicate good resistance to acid attack. Each of the fusion buttons was also subjected to another test which has been devised to indicate the durability of the frits against alkaline detergents such as are employed in commercial dishwashers. In this practice, weighed fusion buttons are immersed into a 0.3% by weight aqueous solution of an alkaline detergent marketed by Economics Laboratories, St. Paul, Minn., under the mark Super Soilax. The immersion is continued for 24 hours at 96° C., following which the samples are withdrawn from the solution, rinsed in tap water, dried, examined visually, and re-weighed to measure any weight loss. The exposure period of 24 hours was considered to represent an accelerated equivalent of several years' actual use in food service applications. A weight loss of no more than about 0.02% is deemed to manifest excellent detergent resistance. The buttons were examined visually after each test to note any change in glossy appearance.

Table II reports the firing temperature utilized (°C.), the % weight loss after 24 hours in the citric acid solution, and the % weight loss after 24 hours in the Super Soilax solution.

TABLE II

| Example No. | Firing Temp. | % Loss Detergent | Change of Gloss | % Loss Citric Acid | Change of Gloss |
|---|---|---|---|---|---|
| 1 | 800° | 0.002 | None | 0.01 | None |
| 2 | 850° | 0.004 | " | 0.02 | " |
| 3 | 850° | 0 | " | 0.02 | " |
| 4 | 850° | 0.007 | " | 0.009 | " |
| 5 | 850° | 0.006 | " | 0.002 | " |
| 6 | 850° | 0.004 | " | 0.003 | " |

As can be seen from Table II, each of the frits displayed excellent resistance to attack by both acids and alkalies. Each of the samples manifested highly glossy surfaces after the tests. This desirable feature is highly important where decorative glazes and enamels are the products sought. For example, glazes have been prepared which demonstrate very low loss of weight after immersion into acids and bases but which are subject to severe loss of gloss as a result. Such products would obviously have no utility where highly decorative food service ware is desired.

To study the utility of the inventive frits in combination with various substrate materials, the above exemplary compositions were fritted, ground to pass a No. 325 United States Standard Sieve, applied to the surface of the substrate, and then fired to maturity.

Thus, the powdered frits of Examples 1 and 2 were blended with about 5% by weight of commercial pigments, the mixture silk screened onto dinner plates of PYROCERAM ® ware, a glass-ceramic tableware product marketed by Corning Glass Works, Corning, New York, having a coefficient of thermal expansion (0°-300° C.) of about $97 \times 10^{-7}/°C.$, and then fired for 15 minutes at 875° and 825° C., respectively. The fired glazes developed good gloss and easily passed both the above-described acid test and an exposure of 96 hours to the detergent test. Inasmuch as the coefficient of thermal expansion of Example 1 is $69.2 \times 10^{-7}/°C.$ and that of Example 2 is $66.1 \times 10^{-7}/°C.$, the glazes produce a surface compression layer on the dinnerware which imparts improved mechanical strength thereto.

Likewise, sufficient powdered frit of Example 3 was suspended in distilled water to yield a solids content of about 65% by weight, this slurry sprayed onto 0.25" diameter rods of a glass-ceramic having a coefficient of thermal expansion (0°-300° C.) of about $100 \times 10^{-7}/°C.$, and then fired at 900° C. for 10 minutes. Again, the fired glaze exhibited good gloss and easily passed both the acid and detergent tests. The lower coefficient of thermal expansion inherent in the Example 3 composition caused the mechanical strength of the rods, as represented in terms of modulus of rupture, to be increased from about 12,000 psi to 22,400 psi.

Finally, slurries of powdered frit of Examples 5 and 6 were prepared in like manner to that described above for Example 3 and sprayed onto 1.25" squares of a glass-ceramic having a coefficient of thermal expansion (0°-300° C.) of about $95 \times 10^{-7}/°C.$ Upon firing for about 10 minutes at temperatures between 800°-900° C., a smooth glaze resulted which displayed high gloss and excellent resistance to acid and detergent. Yet again, the lower coefficient of thermal expansion of the glazes with respect to the substrate imparted improved mechanical strength to the sample squares.

I claim:

1. A frit essentially free from cadmium and lead demonstrating good glass stability, a coefficient of thermal expansion (20°-300° C.) between about $65-75 \times 10^{-7}/°C.$, a viscosity suitable for firing at about 700°-950° C., and excellent resistance to attack by acids and bases as evidenced by no change of gloss and a weight loss of no more than about 0.02% after immersion for 24 hours at 96° C. into an aqueous solution containing 10% by weight citric acid and by no change of gloss and a weight loss of no more than about 0.02% after immersion for 24 hours at 96° C. into an aqueous solution containing 0.3% by weight of an alkaline detergent, said frit consisting essentially, expressed in weight percent on the oxide basis as calculated from the batch, of

| | |
|---|---|
| $SiO_2$ | 35–47 |
| $B_2O_3$ | 5.5–9 |
| BaO | 24–42 |
| $TiO_2$ | 1.5–4 |
| $ZrO_2$ | 6–10 |
| $Li_2O$ | 1–5 |
| MgO | 0–5 |
| CaO | 0–4 |
| SrO | 0–8 |
| ZnO | 0–10 |
| $Bi_2O_3$ | 0–8 |
| MgO + CaO + SrO + ZnO + $Bi_2O_3$ | 0–10 |

2. A frit according to claim 1 exhibiting a coefficient of thermal expansion (20°-300° C.) between about $65-70 \times 10^{-7}/°C.$ and a viscosity suitable for firing at about 700°-850° C. consisting essentially, expressed in weight percent on the oxide basis as calculated from the batch, of

| | | | |
|---|---|---|---|
| $SiO_2$ | 35–47 | MgO | 0–4 |
| $B_2O_3$ | 6–8 | CaO | 0–4 |
| BaO | 31–39 | SrO | 0–8 |
| $TiO_2$ | 2–3 | ZnO | 0–6 |
| $ZrO_2$ | 8–9.5 | $Bi_2O_3$ | 0–7 |
| $Li_2O$ | 1–2.5 | | |
| MgO + CaO + SrO + ZnO + $Bi_2O_3$ | | 2–8 | |

* * * * *